United States Patent [19]

Newton et al.

[11] Patent Number: 4,878,760
[45] Date of Patent: Nov. 7, 1989

[54] MIXING AND DISPENSING APPARATUS FOR A FROZEN CONFECTION MACHINE

[75] Inventors: Robert K. Newton; Steven M. Schmalz, both of Beloit, Wis.

[73] Assignee: Specialty Equipment Companies, Inc., Rockton, Ill.

[21] Appl. No.: 340,257

[22] Filed: Apr. 19, 1989

[51] Int. Cl.$^4$ .............................................. A23G 9/00
[52] U.S. Cl. ..................................... 366/149; 62/342; 222/235; 366/189; 366/190; 366/196
[58] Field of Search ............... 366/149, 144, 145, 177, 366/181, 182, 196, 189, 190, 279, 290; 222/129.3, 129.1, 145, 235; 426/565; 99/452, 453, 454, 455; 62/342, 343

[56] References Cited

U.S. PATENT DOCUMENTS

| | | | |
|---|---|---|---|
| 1,449,623 | 3/1923 | Pfouts . | |
| 2,239,165 | 4/1941 | Adams . | |
| 2,855,007 | 10/1958 | Erickson | 222/235 |
| 3,052,376 | 9/1962 | Fogg | 222/235 |
| 3,132,847 | 5/1964 | Mercuriali . | |
| 4,580,905 | 4/1986 | Schwitters et al. . | |
| 4,758,097 | 7/1988 | Iles | 366/149 |

*Primary Examiner*—Robert W. Jenkins
*Attorney, Agent, or Firm*—Vernon J. Pillote

[57] ABSTRACT

Mixing and dispensing apparatus for a frozen confection machine for mixing and dispensing a measured volume of frozen confection material and a flavoring material including edible solids. The apparatus comprises a mixing and measuring chamber including a mixing cylinder having a discharge head at one end, a rotary mixer in the cylinder and a dispensing piston slidable in the cylinder. The mixing and measuring chamber has a flavoring material inlet port, a flavoring material feed chamber communicating with the flavoring material inlet port, and a flavoring material feed piston for feeding flavoring material from the feed chamber to the mixing cylinder. The mixing and measuring chamber also has confection material inlet port adapted for connection to a frozen confection machine and a confection inlet valve for controlling flow of confection to the mixing cylinder. The discharge head has a discharge passage and a discharge valve for controlling flow through the discharge passage. Operating mechanism is provided for moving the dispensing piston in the mixing cylinder to a position contiguous to the discharge head to discharge substantially all of the material from the chamber. Heat transfer apparatus is provided for cooling the mixing cylinder from the frozen confection machine.

30 Claims, 5 Drawing Sheets

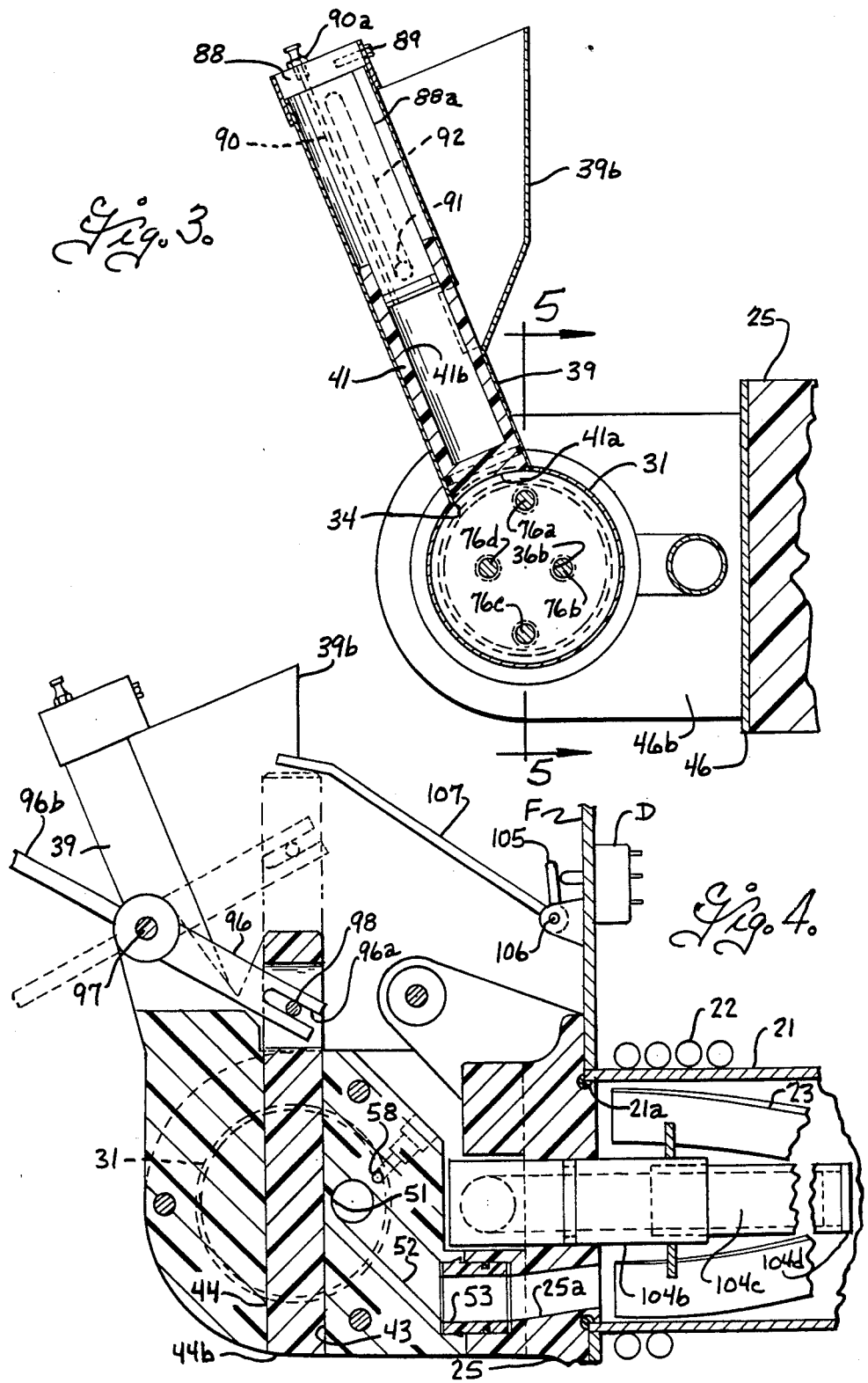

MIXING AND DISPENSING APPARATUS FOR A FROZEN CONFECTION MACHINE

BACKGROUND OF THE INVENTION

Apparatus has heretofore been made for example as disclosed in U.S. Pat. No. 4,580,905, for mixing and dispensing a liquid flavoring material with a neutral frozen confection such as ice cream, frozen custard or the like to produce a flavored frozen confection. In general, the liquid flavoring material is stored under pressure and the frozen confection and flavoring material are fed simultaneously into a mixing chamber having an open lower discharge outlet, and a mixer in the chamber mixes the frozen confection and flavoring material as it flows to the discharge outlet. As disclosed in this patent, the valve piston is arranged to telescope with the mixer as the valve piston is moved downwardly, to discharge substantially all of the mixture from the mixing chamber and thereby minimize flavor carry over. While the apparatus disclosed in this patent is suitable for blending and dispensing a flowable liquid material on a flowing stream of frozen confection, it was not adapted for mixing edible solids such as pieces of fruit, nuts, candy and the like with a frozen confection.

It is desirable to distribute the edible solids uniformly in the confection material without comminuting the edible solids. However, in a mixing apparatus as disclosed in the above patent wherein the mixer is rotated at a sufficiently high speed to mix the flavoring material and confection as they flow in a stream through the dispensing nozzle, the mixer would tend to break-up and comminute the solid edibles. Further, the prior mixing and dispensing apparatus could not feed a charge of edible solids into the mixing chamber. In addition, the prior mixing and dispensing apparatus did not mix and dispense a measured volume of material.

Some frozen confection machines such as disclosed in U.S. Pat. No. 1,449,623, mix edible solids in the frozen confection freezer to form a relatively large batch of the frozen confection mixture. Some other frozen confection machines such as disclosed in U.S. Pat. Nos. 2,239,165 and 3,132,847 feed and mix edible solids with frozen confection as it issues in a continuous stream from a frozen confection freezer. However, such frozen confection machines are not suitable for mixing a selected one of a plurality of different edible solid materials with a frozen confection, in small, serving size quantities.

SUMMARY OF THE INVENTION

It is an object of the present invention to provide an apparatus for mixing and dispensing a measured volume of frozen confection and a flavoring material containing edible solids.

Another object of this invention is to provide an apparatus for mixing and dispensing a volume of frozen confection and a flavoring material containing edible solids, and which minimizes carry-over of solids and flavors from one batch to the next.

Another object of this invention is to provide a mixing and dispensing apparatus in accordance with the foregoing object and which minimizes comminution of the edible solids during mixing and dispensing.

Still another object of this invention is to provide an apparatus for mixing and dispensing a measured volume of frozen confection and flavoring material, and which reduces the number of manual operations that must be performed by the operator during mixing and dispensing a measured volume of mixed materials.

Yet another object of this invention is to provide an apparatus for mixing and dispensing a measured volume of frozen confection and flavoring material, and which reduces melting or softening of the frozen confection during mixing and dispensing.

Accordingly, the present invention provides a mixing and dispensing apparatus for a frozen confection machine for mixing and dispensing a volume of semi-solid confection material and a flavoring material including edible solids, the apparatus comprising a mixing and measuring chamber means including a mixing cylinder having a discharge head at one end, and a dispensing piston slidable in the mixing cylinder between a position adjacent the discharge head and a position spaced from the discharge head. The mixing and measuring chamber means has a flavoring material inlet port and a flavoring material feed chamber communicating with the flavoring material inlet port adapted to receive a charge of flavoring material, and a flavoring material feed means for feeding flavoring material from the feed chamber to the mixing cylinder. The mixing and measuring chamber means has confection material inlet port adapted for connection to a frozen confection machine and confection inlet valve means for controling flow of confection to the confection inlet port. The discharge head has a discharge passage and a discharge valve for controlling flow through the discharge passage.

Flavoring material and frozen confection are introduced into the mixing and measuring chamber means while the discharge valve is closed, and the confection material inlet port and flavoring material inlet ports are closed while the rotary mixer is operated to mix the flavoring material and the frozen confection in the mixing and measuring cylinder. The discharge valve is thereafter opened and the dispensing piston moved toward the discharge head to discharge the mixture from the mixing cylinder.

The dispensing piston is supported for rotation in the cylinder with the rotary mixer and is slidable relative to the rotary mixer to a position in which the end face of the piston is contiguous to the inner face of the discharge head to force substantially all of the mixture from the mixing cylinder. The discharge passage is advantageously in the form of a channel that opens along its side at the inner face of the discharge head to minimize crushing of the particulate material as the piston moves to a position adjacent the discharge head during dispensing of material from the cylinder. During dispensing, the end face of the piston spins against the inner face of the discharge head so that material is wiped from both faces and is forced into the discharge channel. The discharge valve comprises a member slidable in the channel to discharge the mixed material from the channel through a discharge outlet at one end of the channel.

The mixing cylinder is advantageously cooled by a closed heat transfer passage means containing a vaporizable heat transfer fluid and having an evaporator zone in heat transfer relation to the mixing cylinder and a condensation zone adapted to extend into the refrigerated freeze chamber of the frozen confection machine.

BRIEF DESCRIPTION OF THE DRAWINGS

FIG. 3 is a vertical sectional view taken on the plane 3—3 of FIG. 1;

FIG. 4 is a vertical sectional view taken on the plane 4—4 of FIG. 1;

DETAILED DESCRIPTION OF THE INVENTION

The present invention relates to an apparatus for mixing and dispensing a measured volume of a semi-solid confection and flavoring material and particularily to a mixing and dispensing apparatus for a frozen confection machine for mixing and dispensing serving size quantities of a frozen confection material and a flavoring material including edible solids such as nuts, candies, chocolate bits, fruits and the like, with or without flavoring syrup. The mixing and dispensing apparatus is adapted for use with a frozen confection machine and is shown in FIGS. 1-6 mounted on the discharge end of a frozen confection freezer F. The frozen confection freezer is of conventional construction and includes a generally horizontal freezing cylinder or barrel 21 having a discharge end 21a. A liquid confection mix such as ice cream, custard, yogurt mix or the like is introduced into the freezing barrel through an inlet (not shown) and the barrel is refrigerated to freeze product on the inner surface of the barrel. An evaporator 22 of a conventional refrigeration mechanism (not shown) is disposed around the outer side of the freezing barrel. As is conventional, the refrigerating mechanism also includes a compressor, condenser and expansion control and the refrigerating mechanism is operated under a temperature and/or viscosity responsive controller to maintain the freezing barrel at the desired temperature for freezing the confection mix on the inner surface of the barrel.

Figure 1:
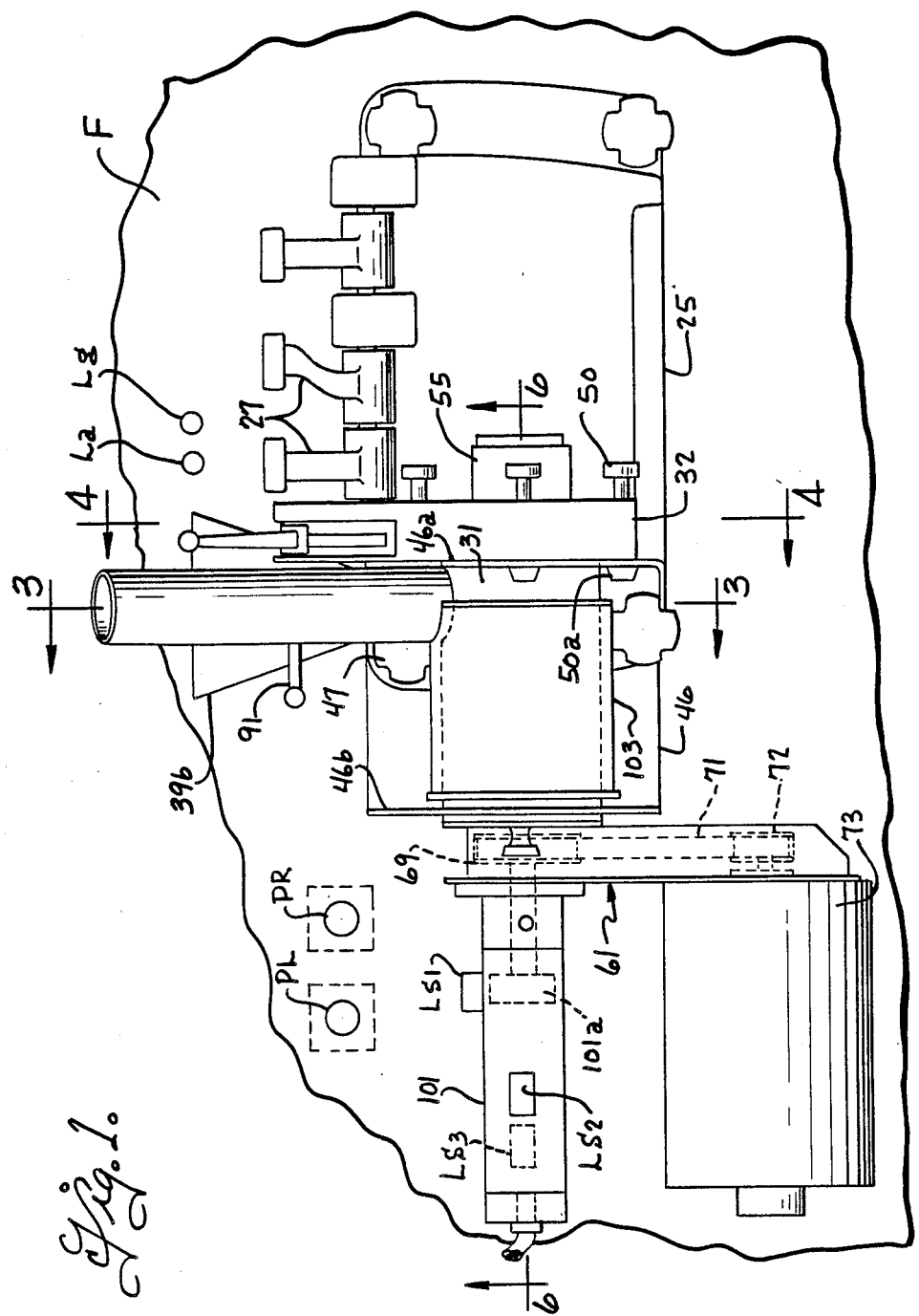
FIG. 1 is a front elevational view of a mixing and dispensing apparatus for a frozen confection machine embodying the present invention.
Figure 2:
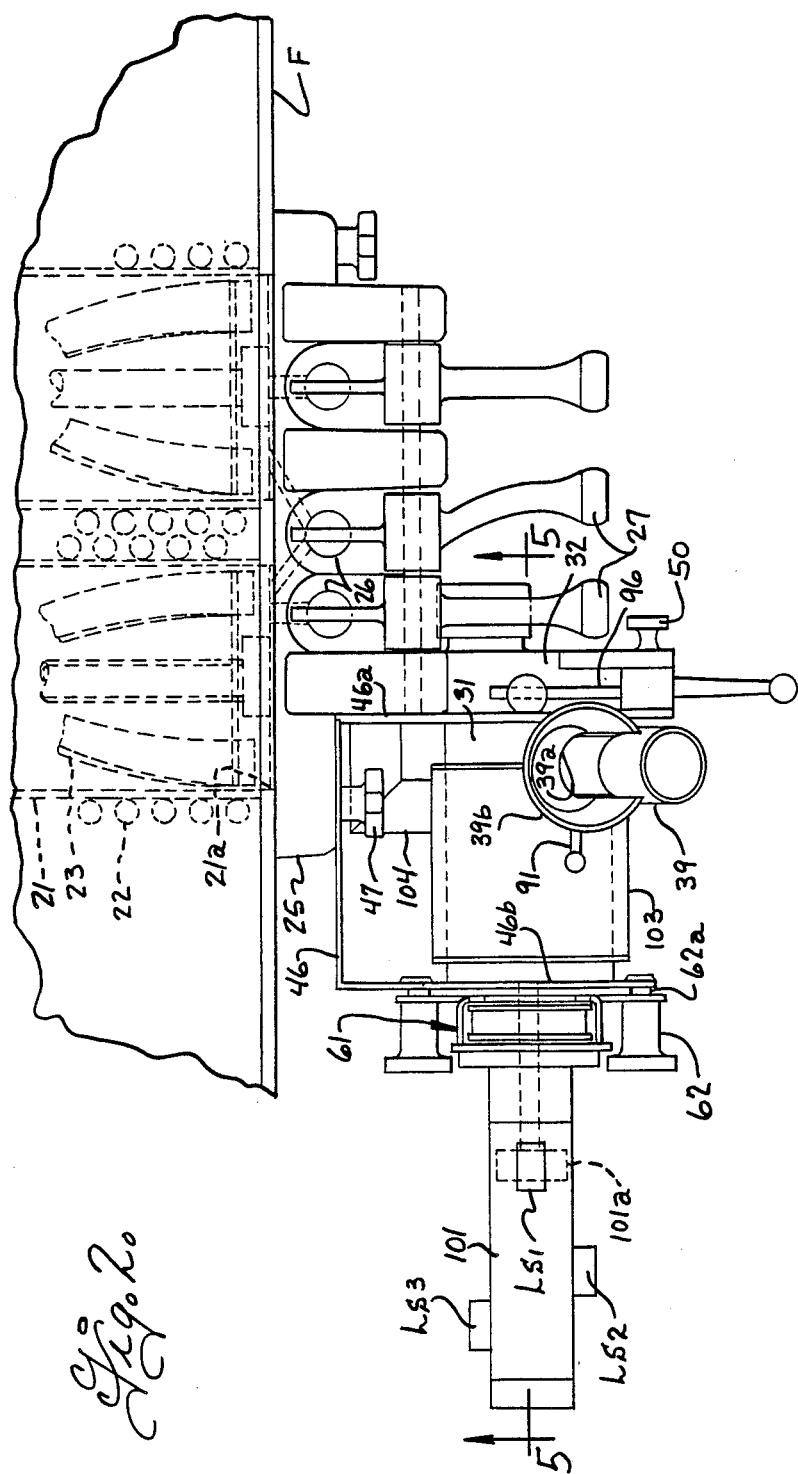
FIG. 2 is a plan view of the mixing and dispensing apparatus for a frozen confection machine.

A rotor or agitator 23 is rotatably mounted in the freezing barrel for removing frozen product from the inner surface of the barrel and for mixing and/or aerating the product in the barrel, and for advancing the product toward the discharge end 21a of the barrel. The rotor is driven by a drive mechanism (not shown) and which commonly includes and electric drive motor and speed reducing mechanism for connecting the drive motor to the rotor. The rotor is arranged to scrape frozen product off the inner surface of the freezing barrel and to advance the product toward the discharge end 21a of the freezing barrel. A door or cover 25 is removably mounted on the discharge end of the freezing barrel to provide a closure for the same and the mixing and dispensing apparatus is conveniently mounted directly on the door 25. As best shown in FIGS. 1 and 2 one or more frozen confection dispensing valves 26 may also be provided on the door 25 and arranged for operation by handles 27 to enable direct dispensing of frozen confection from the freezing cylinder 21. As is conventional, a switch mechanism (not shown) is provided on the frozen confection machine F and arranged to be actuated when one of the frozen confection dispensing valves 26 is opened, to operate the drive motor for the rotor 23 and the drive motor for the refrigeration apparatus, during dispensing of frozen confection.

Figure 6:
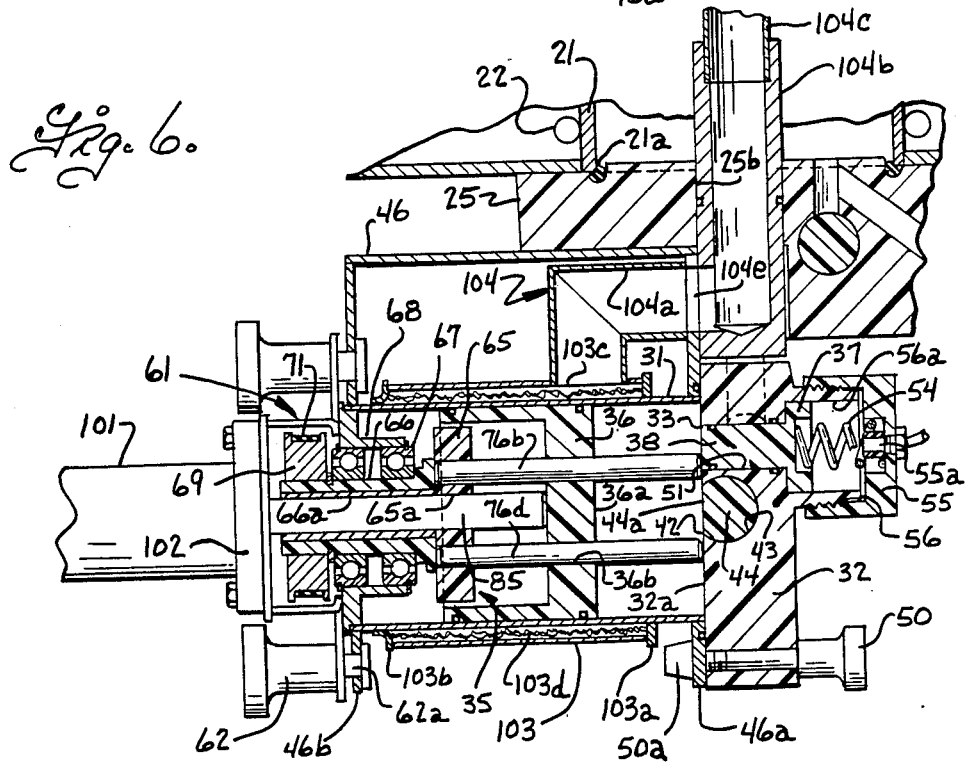
FIG. 6 is vertical sectional view taken on the plane 6—6 of FIG. 1 and showing the dispensing piston in its retracted position.

The mixing and dispensing apparatus includes mixing and measuring chamber means comprising a mixing cylinder 31, a discharge head 32 at one end of the cylinder, and a dispensing piston 36 slidable in the mixing cylinder. The mixing and measuring chamber means has a frozen confection inlet port 33, a particulate material inlet port 34 (FIG. 3) and a discharge port 42 (FIG. 6). A rotary mixer 35 is mounted for rotation on the mixing cylinder and the dispensing piston 36 is mounted in the mixing cylinder for rotation with the rotary mixer and for sliding movement relative to the mixing cylinder 31 and mixer 35 between a position in which an end face 36a of the piston is spaced from the discharge head to measure a quantity of material, and a position in which the piston end face is contiguous to the inner face 32a of the discharge head to discharge substantially all of the material out of the mixing cylinder. A confection inlet valve 38 (FIG. 6) is provided for controlling the flow of frozen confection from the freeze cylinder 21 of the frozen confection freezer F to the mixing cylinder 31. A particulate material feed chamber or cylinder 39 communicates with the particulate material inlet port 34, and a particulate material feed means 41 (FIG. 3) is provided to feed particulate material from the feed chamber to the mixing cylinder. The discharge head 32 has a discharge passage 43 and a discharge valve 44 for controlling flow of mixed material from the mixing cylinder through the discharge passage.

The mixing and dispensing apparatus is advantageously mounted on the door 25 of the frozen confection freezer and, as best shown in FIGS. 1-6, the mixing and dispensing apparatus has a generally U-shaped mounting bracket 46 that is removably mounted on the front face of the door 25 of the freezer, as by the door mounting knobs 47. The mixing cylinder 31 is rigidly secured as by welding to the legs 46a and 46b of the U-shaped bracket 46 and the axis of the mixing cylinder is preferably disposed generally horizontally. The discharge head 32 is removably mounted on one end of the mixing cylinder as by thumb screws 50 that threadedly engage threaded inserts 50a on the leg 46a of the mounting bracket 46, to facilitate cleaning of the apparatus. In the preferred embodiment illustrated, the confection inlet port 33 is located at the inner face 32a of the discharge head 32 and, as best shown in FIG. 6, the confection inlet valve 38 is slidably disposed in a valve bore 51 in the discharge head, which valve bore communicates intermediate its ends with a confection inlet passage 52. An adapter fitting 53 (FIG. 4) is mounted on the discharge head in communication with the confection inlet passage 52 and is adapted for reception in the outer end of a confection supply passage 25a that communicates with the discharge end 21a of the freezing cylinder 21. The confection inlet valve 38 is slidable in the valve bore 51 and yieldably biased to a closed position blocking flow from the confection inlet passage 52 to the confection inlet port 33, by a spring 54 interposed between one end of the valve 38 and a cap 55 removably mounted on a threaded boss 56 on the discharge head. The confection inlet valve is shown in its closed position in FIG. 6 and, in the preferred embodiment illustrated, the valve 38 is adapted to be pneumatically actuated to its open and closed positions. As shown in FIG. 6, the confection inlet valve 38 has an actuator head 37 at one end that is slidable in a bore 56a in the boss 56 on the discharge head. Air under pressure is selectively applied through passages 58 (FIG. 4) in the discharge head to an inner side of the actuator head 37 to actuate the confection inlet valve to its open position and through a passage 55a in the cap 55 to an outer side of the actuator head 37 to actuate the confection inlet valve to its closed position.

Figure 5:
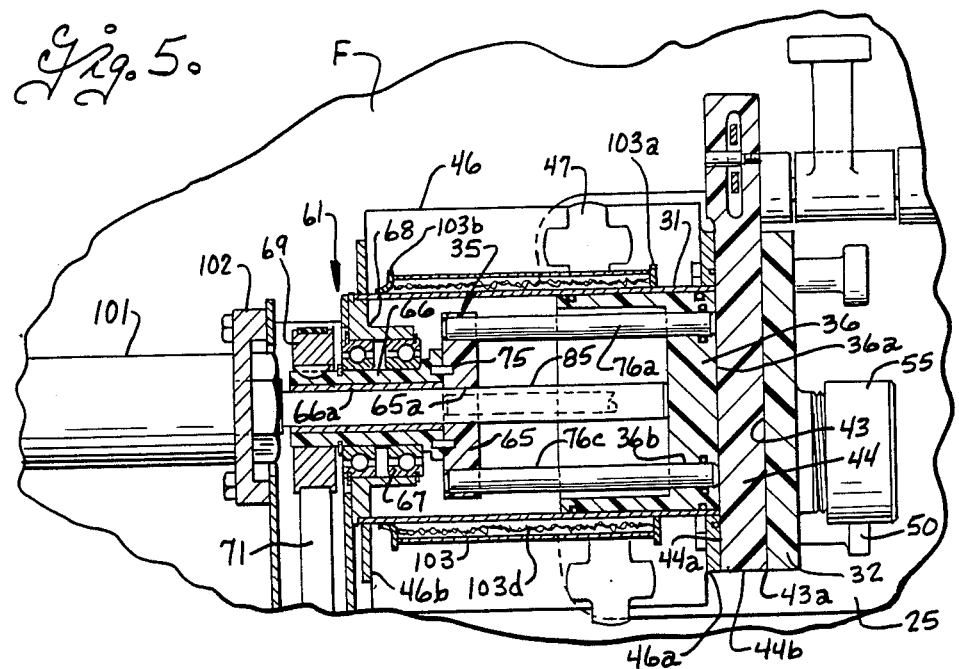
FIG. 5 is a sectional view taken on the plane 5—5 of FIG. 3, and illustrating the dispensing piston in its extended position.

A drive mounting frame 61 is removably mounted on the end of the mixing cylinder 31 remote from the discharge head 32, as by knobs 62 that engage studs 62a on the leg 46b of the mounting bracket 46. As shown in FIGS. 5 and 6, the rotary mixer 35 includes a drive head 65 that is disposed in the mixing cylinder and which drive head is detachably and nonrotatably connected to a hollow drive shaft 66 that is rotatably supported by bearings 67 on a hub 68 at one end of the mixing cylinder. A pulley 69 is nonrotatably connected to the drive shaft 66 and is driven through a belt 71 and drive pulley 72 on a motor 73. The motor 73 is mounted on the drive mounting frame 61 at a location offset from the mixing cylinder 31 and with its axis paralleling the axis of the mixing cylinder.

The drive head 65 is located at the side of the dispensing piston 36 remote from the discharge head and, as best shown in FIG. 5, the drive head 65 is drivingly connected to the shaft 66 by pins 75 that extend into recesses in the end face of the drive head and into openings or sockets in the adjacent end face of the drive shaft. A plurality of mixer elements, herein shown four in number and designated 76a-76d are secured to the drive head and extend generally parallel to the mixing cylinder and terminate with their ends adjacent the inner face 32a of the discharge head 32. As will be seen from FIGS. 3, 5 and 6 some of the mixer elements 76a, 76c are spaced radially outwardly from other mixer elements 76b, 76d to provide more uniform mixing throughout the cross section of the mixing cylinder.

The measuring and dispensing piston 36 is mounted in the mixing cylinder for rotation with the mixer and has passages 36b therethrough for slidably receiving the mixing elements 76a-76d. Seal rings are mounted in grooves on the outer periphery of the piston to seal the interface between the piston and mixing cylinder and seal rings are mounted in grooves in the passages 36b in the piston, to form a sliding seal with the mixing elements 76a-76d. A piston actuator rod 85 slidably and rotatably extends through a bore 65a in the drive head 65 and through a bore 66a in the drive shaft 66, and the actuator rod 85 is arranged to engage the dispensing piston to move the piston from a retracted or fill position as shown in FIG. 6 through a dispensing stroke to an extended or discharge position as shown in FIG .5, while allowing rotation of the mixer and piston in the mixing cylinder. A means described more fully hereinafter is provided for moving the dispensing piston in a dispensing stroke.

The particulate material feed chamber 39 is preferably in the form of a cylinder that communicates at one end with the particulate material inlet port 34 in the side of the mixing cylinder and the feed cylinder preferably extends upwardly from the mixing cylinder to aid in feeding particulate material to the mixing cylinder. As shown in FIG. 3, the feed cylinder 39 has an inlet opening 39a intermediate its ends and a hopper or funnel 39b extends outwardly and upwardly from the opening 39a at an angle to aid in gravitationally feeding a charge of particulate material into the feed cylinder. In the preferred embodiment shown, the feed cylinder 39 is inclined forwardly at an angle of about 22.5° to a vertical plane through the axis of the mixing cylinder and the funnel 39b is positioned at the rear side of the feed cylinder with its walls disposed as upright as practical, to aid in draining of material from the hopper into the feed cylinder. The feed means 41 is advantageously in the form of a feed piston slidable in the feed cylinder 39. The feed piston 41 is arranged to be manually moved to a retracted position and, and in the preferred embodiment, the feed piston is pneumatically moved to an extended position to feed a charge of flavoring material into the mixing and measuring cylinder. As best shown in FIGS. 1-3, the feed piston has an operating rod 91 that extends through a slot 92 in the side of the feed cylinder. The feed piston 41 has a piston actuator cylinder 41b formed therein that opens at the end remote from the mixing cylinder, and an actuator head 88 is removably secured to the feed cylinder by a pin 89 and has an actuator piston 88a thereon that slidably extends into the actuator cylinder 41b. As shown in FIG. 3, air pressure is supplied to the pneumatic actuator cylinder 41b through passage means 90 in the head 88 and actuator piston 88a to extend feed piston 41 and feed particulate material from the feed cylinder 39 into the mixing cylinder. A fitting 90a is provided the actuator head 88 to connect the air passage 90 to a valved air line. The forward end 41a of the feed piston is advantageously made cylindrically concave as shown in FIG. 3, to substantially conform to the curvature of the inner wall of the mixing cylinder when the feed piston is in its extended position. With this arrangement, the dispensing piston 36 will wipe across the forward end 41a of the particulate material feed piston 41, when the dispensing piston is moved forwardly in a dispensing stroke.

The discharge passage 43 in the discharge head is advantageously in the form of a semi-cylindrical channel that opens along its side at the inner face of the discharge end, and which defines a discharge outlet 43a at one end of the channel. The discharge valve 44 is formed complementary to the channel shaped discharge passage 43 and, as shown in FIGS. 5 and 6, has a flat side face 44a disposed coplanar with the inner face of the discharge head. The discharge valve 44 is slidable in the passage between an extended position, as shown in FIG. 5, in which one end face 44b is disposed substantially flush with the lower side of the discharge head at the discharge outlet 43a, and a retracted position in which the end face 44b is spaced inwardly from discharge outlet 43a for discharge of material from the mixing cylinder. The discharage valve 44 is preferably retractable to a position in which the end face 44b is slightly above the axis of the mixing cylinder to provide a radially elongated opening for the passage of material from the mixing cylinder into the discharge channel, to minimize crushing of the particulate material as the dispensing piston 36 is extended. Since the dispensing piston 36 also rotates with the mixer as the piston is extended, the forward end of the dispensing piston will wipe across the edges of the discharge opening when the dispensing piston is in its extended position as shown in FIG. 5, to thereby clean off product from the forward end of piston. The discharge valve is moved toward the discharge outlet 43a after the dispensing piston 36 is moved to its extended position, so that the discharge valve forces the mixture out of the passage 43 to the discharge outlet 43a, to minimize product carry over between dispensing cycles. In the preferred embodiment illustrated, the discharge passage 43 is disposed generally vertically with the discharge outlet 43a at its lower end, to facilitate discharge of material from the discharge passage.

The discharge valve 44 is arranged to be manually operated between its open and closed positions and, as best shown in FIG. 4, a discharge valve operator 96 is pivotally mounted at 97 on the discharge head, at a location to offset from the discharge passage 43, and the valve operator has a slot 96a in one end portion arranged to receive cross pin 98 on the discharge valve to move the discharge valve between its open and closed positions in response to pivotal movement of the discharge valve operator 96. The discharge valve is operated manually by a handle portion 96b on the discharge valve operator 96.

The dispensing piston 36 is arranged so that it will move from a first or discharge position as shown in FIG. 5 contiguous to the discharge head, to a second or a retracted position as shown in FIG. 6, in response to the pressure exerted by the frozen confection material and flavoring material introduced into the mixing and measuring cylinder 31, and actuator means are provided for moving the dispensing piston from its second position back to its first position to discharge the mixed material from the mixing cylinder. The actuator means is preferably of the pneumatic type and, as shown in FIG. 1, includes a pneumatic cylinder 101 mounted as by a cap 102 on the drive mounting frame 61, and an actuator piston 101a in the cylinder. The actuator rod 85 is fixed to actuator piston 101a and extends from one end of the actuator cylinder to engage and move the dispensing piston 36 to its discharge position and discharge material from the measuring chamber, when the actuator piston 101a is extended.

Means are advantageously provided for cooling the mixing cylinder 31 to reduce melting of the frozen confection during mixing and dispensing. As best shown in FIGS. 5 and 6, a cooling jacket including a generally cylindrical shell 103 and end rings 103a and 103b extends around a substantial portion of the mixing cylinder and is sealed thereto as by welding. A heat transfer pipe 104 communicates through an opening 103c with the cooling jacket and extends into the freeze cylinder 21 of the frozen confection freezer. The heat pipe is arranged so that it can be installed and removed as a unit with the mixing cylinder and, as best shown in FIG. 6, includes an elbow portion 104a that extends from the shell 103 to the leg 46a of the mounting bracket 46; an intermediate section 104b that removably extends through a passage 25b in the door 25; and an inner section 104c that extends into the freeze cylinder 21 generally axially thereof and which is closed by a cap 104d (FIG. 4). The elbow 104a and intermediate section 104b are welded to opposite sides of the leg 46a and communicate through an opening 104e therein; and the intermediate section 104b is sealed to the passage 25b in the door 25 by a seal ring. The jacket 103 and heat transfer pipe 104 define a closed heat transfer passage and a charge of a vaporizable heat transfer fluid such as "Freon" refrigerant is introduced into the heat transfer passage before it is closed. The type and charge of heat transfer fluid is selected such that, at about the solidification temperature of the frozen confection, a portion of the heat transfer fluid will be in a liquid state and a portion will be in the vapor state. The pipe 104 connects to the shell 103 at a location somewhat above the lowest part of the shell so that heat transfer fluid which condenses in the inner section 104c can drain into the lower part of cooling jacket. The heat transfer fluid can vaporize in the cooling jacket to cool the mixing cylinder. A wick 103d, such as cotton fibers, is provided in the cooling jacket and arranged to extend upwardly around the mixing cylinder to effect generally uniform cooling of the mixing cylinder and any suitable means such as a piece of wire screen (not shown) can be used to hold the wick in position around the mixing cylinder. The mixing cylinder and cooling jacket are preferably covered with suitable heat insulation and a protective cover (not shown), illustration and further description of which is not believed necessary to an understanding of the present invention.

Figure 7:
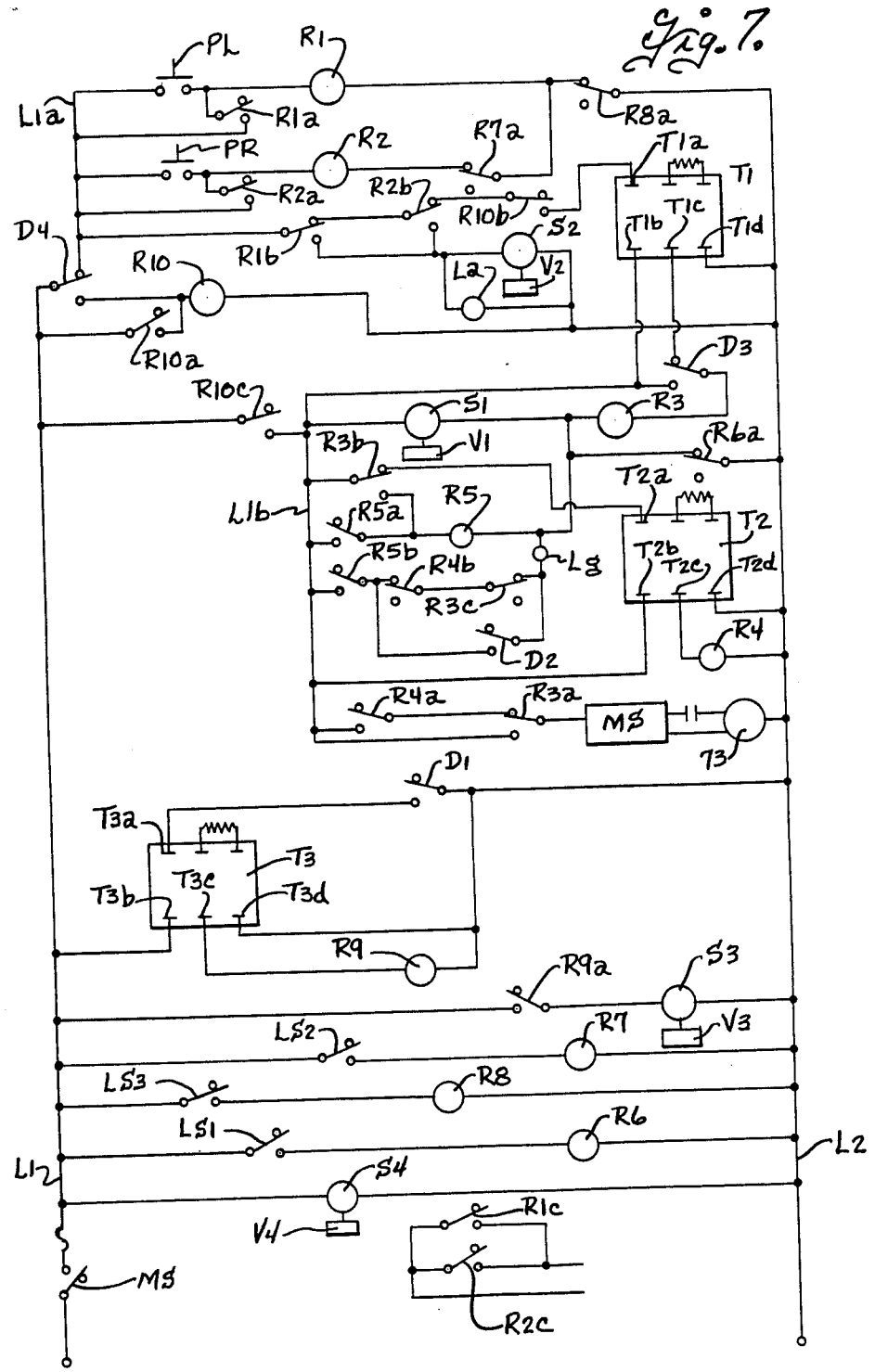
FIG. 7 is a schemmatic eletrical diagram for the mixing and dispensing apparatus.

Air under pressure from a source of pressurized air (not shown) is selectively supplied and exhausted from the blind end of the pneumatic actuator cylinder 101 by a two-way valve designated V3 in FIG. 7 and controlled by a solenoid S3. Air under pressure is reversibly supplied passages 58 and 55a to the inner and outer sides of the actuator head 37 to actuate the inlet valve to an open position and to a closed position under the control of a three-way valve designated V2 in FIG. 7, and actuated by a solenoid S2. Air under pressure is selectively supplied and exhausted from the cylinder 41b in the particulate feed piston under the control of a two-way valve designated V1 in FIG. 7 operated by a solenoid S1. Limit switches LS1, LS2 and LS3 are provided to sense the position of the dispensing piston 36 in the mixing cylinder 31. The position of the actuator piston 101a in the cylinder 101 is correlative with the position of the dispensing piston 36 in the mixing cylinder 31, and the limit switches are conveniently magnetically operated reed switches arranged to sense the position of the actuator piston. As best shown in FIGS. 1 and 2, limit switch LS1 is mounted on the actuator cylinder 101 for operation by a magnet on the actuator piston 101a when the dispensing piston is in home or discharge position shown in FIG. 5. The second limit switch designated LS2 is mounted on actuator cylinder 101 at a location to be actuated by a magnet on the actuator piston 101a when the dispensing piston rod is in a preselected intermediate position in which the volume defined by the piston in the measuring cylinder corresponds to a preselected serving size, herein sometimes referred to as a regular serving, and the third switch LS3 is mounted on the actuator cylinder 101 at a location to be actuated by the actuator piston 101a when the volume defined by the piston 36 in the measuring cylinder corresponds to a desired large size filling. As is apparent, the location of the limit switches LS2 and LS3 can be selected and/or adjusted in accordance with the desired size of the servings. As shown in FIG. 4, a dispensing switch means D is mounted on the frozen confection freezer F, and a dispensing switch actuator 105 is pivotally mounted at 106 on the frozen confection freezer and actuated by a lever 107 that overlies the path of movement of the discharge valve 44, when the latter is moved to its open or discharge position. For reasons pointed out hereinafter, the dispensing switch means D includes four dispensing switches designated D1, D2, D3, and D4 in FIG. 7. In addition to the above, serving size selection and cycle initiation switches designated PL and PR are provided and mounted at a convenient location such as on the front of the frozen confection machine F.

A control system for operating the confection inlet valve 38; the flavoring material feed piston 41; and the blender drive motor in a "fill" cycle in response to actuation of one of the fill cycle initiating switches PL or PR, and for operating the dispenser actuator 101 and the blender drive motor 73 during a "dispensing" cycle in response to opening of the discharge valve 44, is shown in the schematic electrical diagram in FIG. 7. AC power is supplied to the control lines L1 and L2 from any suitable source under the control of a main switch designated MS. When power is supplied to line L1, main air solenoid S4 is energized to open main air valve V4 and supply air to the other valves V1–V3. The dispensing switches D1–D4 are normally positioned in engagement with the normally closed contacts as shown in FIG. 7 and, at start-up, the lever 96b is operated to move the discharge valve 44 to its raised position and, after a short time of the order of a few seconds, back to its lower position shown in FIG. 4. The draw switch D4 is arranged to connect line L1 to a line designated L1a when the draw switch is in its normal position and, when draw switch D4 is moved into engagement with its normally open contact, it energizes a relay R10. Relay R10, when energized, moves relay switch R10a into engagement with its normally open contact to establish a holding circuit for relay R10. In addition, relay R10 when energized moves normally open relay switch R10b into engagement with its normally open contact and relay switch R10c into engagement with its normally open contact to connect line L1 to a conductor designated L1b in FIG. 7. Relay R10 remains energized when the draw switch D4 is moved back to its normal closed contact to connect line L1 to line L1a.

As previously described, limit switch LS1 senses when the actuator piston 101a and hence the dispensing piston 36 is in its discharge or home position. Limit switch LS1 is a normally open switch and is connected in series with a control relay R6 across lines L1 and L2 so that relay R6 is energized when the dispensing piston is in its home position. Limit switch LS2 is normally open and is connected in a series circuit with a control relay R7 across lines L1 and L2. Limit switch LS2 is actuated to its closed position to energize relay R7 and open relay switch R7a when the actuator piston 101a and hence the dispensing piston 36 is at a position corresponding to a "regular" size serving, and limit switch LS3 is normally open and is connected in a series circuit with a control relay R8 between lines L1 and L2. Switch LS3 is moved to its closed position to energize relay R8 and open relay switch R8a, when the actuator piston 101a and hence the dispensing piston 36 is in a position corresponding to a "large" size serving.

Push button PL is a manually operable normally open switch for selecting a large size serving. As shown in FIG. 7, switch PL is connected in series with a control relay R1 and the normally closed contact of relay switch R8a between lines L1a and L2. Switch PR is a manual operable normally open switch for selecting a regular size serving and is connected in series with a control relay R2 and the normally closed contact of relay switch R7a and the normally closed contact of relay switch R8a across lines L1a and L2. Relay R1 is operative when energized to move relay switches R1a, R1b and R1c from a position engaging the normally open contacts as shown in FIG. 7 to a position engaging the normally closed contact, and relay R2 is operative when energized to move relay switches R2a, R2b and R2c from a position engaging the normally open contacts as shown in FIG. 7 to a position engaging the normally closed contact. Relay switch R1a is connected parallel with the manually operable switch PL and is operative, when the relay R1 is energized, to establish a holding circuit for relay R1 to maintain relay R1a energized until relay switch R8a is moved to its open position. Relay switch R2a is connected in parallel with manually operable switch PR and is operative when relay R2 is energized to establish a holding circuit for relay R2. Relay switches R1b and R2b are connected to each other to establish a circuit through their normally closed contacts and relay switch R10b to an input terminal T1a of a timer T1 and the normally open contacts of relay switches R1b and R2b are connected to energize the solenoid S2 for the air valve V2 that controls application of a pressure to the piston 37 of the confection inlet valve 38. Solenoid S2 is energized in response to operation of either relay R1 or R2 and will actuate valve V2 to supply pressure to passage 58 to open the confection inlet valve. An indicator lamp designated La is connected in parallel with solenoid S2 to give the operator a visual indication that the mixing cylinder is being filled. Relay switches R1c and R2c are connected in parallel with the conventional draw switches (not shown) provided on the soft serve machine to start the refrigeration compressor and the drive motor for the beater 23, when either relay R1 or R2 is energized. The dispensing piston is normally in its home or a discharge position and limit switch LS1 is closed and energizes relay R6 to open relay switch R6a. Frozen confection entering the mixing cylinder through the confection inlet port 33 forces the dispensing piston away from the discharge head and, as the dispensing piston moves away from the discharge head, it moves the actuator piston 101a away from its home position, and limit switch LS1 opens and de-energize relay R6 to allow relay switch R6a to move back to its normally closed position shown in FIG. 7. The flavoring material feed solenoid S1 is connected in series from line L1b through relay switch R6a to line L2 so that the solenoid S1 is energized when the dispensing piston moves only a short distance away from its home or discharge position. Solenoid S1 operates valve V1 to apply pneumatic pressure to the flavoring material feed piston 41 to force flavoring material from the feed cylinder 39 into the mixing cylinder 31. Thus, the flavoring material is forced into the mixing cylinder at the same time that the frozen confection enters into the mixing cylinder through the confection inlet port.

If a cycle is initiated in response to operation of push button PL, relay R8 will be energized and open relay switch R8a when limit switch LS3 is closed by the actuator piston 101a, and thereby de-energize relay R1. Alternatively, if a cycle is initiated in response to actuation of switch PR, relay R7 will be energized and open relay switch R7a in response to closing of limit switch LS2 by actuator piston 101a, to thereby open relay switch R7a and de-energize relay R2. When relays R1 and R2 are deenergized, fill solenoid S2 is de-energized and three-way valve V2 moves back to a position supplying air under pressure to port 55a to move the fill valve 38 to its closed position. Further, when relay R1 and R2 are deenergized, the cycle input terminal T1a of timer T1 is connected through relay switch R10b, relay switches R2b and R1b, draw switch D4 and relay switch R10c to the timer terminal T1b to initiate a timing cycle in timer T1. Timer T1 is a single shot timer which is operative upon establishing a circuit between terminals T1a and T1b, either momentarily or maintained, to energize an output load connected across terminals T1c and T1d. Terminal T1c is connected to the normally closed contact of draw switch D3, the normally open contact of which is connected to conductor L1b. Draw switch D3 is connected to a control relay R3 which is otherwise connected through relay switch R6a to line L2. Thus, when the mixing cylinder is filled to the selected "regular" or "large" serving size, relay R3 is energized for a preselected time interval determined by timer T1 and, it operates the relay switches R3a, R3b and R3c from a position engaging the normally closed contacts shown in FIG. 7 to a position engaging the normally open contacts. Relay switch R3a, when actuated into engagement with its normally open contact, connects conductor L1b to the motor start control MS to energize the mixer drive motor 73 for the time interval determined by timer T1. The normally closed contact of relay switch R3b is connected to a timer input terminal T2a of a timer T2 and the normally open contact of relay switch R3b is connected to a relay R5. When relay switch R3b is moved out of engagement with its normally closed contact and into engagement with its normally open contact, it disconnects the input terminal T2a from conductor L1b and connects the relay R5 to conductor L1b to energize relay R5. Relay R5, when energized, closes relay switch R5a to establish a holding circuit to maintain relay R5 energized until relay switch R6a is opened. Relay switch R5b is connected to the normally closed contact of a relay switch R4b of a relay R4 and switch R4b is connected to relay switch R3c, the normally closed contact of which is connected to a "serve" light LG that is otherwise connected through relay switch R6a to line L2. When relay R3 is energized it opens relay switch R3c so that the serve light LG is not energized while relay R3 is energized by timer T1.

Timer T2 is a single shot timer which is operative upon establishing a circuit between terminals T2a and T2b, either momentarily or maintained to initiate a timing cycle and energize an output load connected across terminals T2c and T2d for a time interval determined by the setting of timer T2, for example two seconds. When the timer T1 times out, relay switch R3b moves back into engagement with its normally closed contact and connects terminal T2a to terminal T2b to start a timing cycle in timer T2. Terminal T2c of timer T2 is connected to relay R4 to energize relay R4 for the time interval determined by timer T2 and, when relay R4 is energized, it moves relay switch R4a into engagement with the normally open contact to establish a circuit to the motor controller MS for the blend motor 73 to again drive the mixer drive motor for a time interval determined by timer T2. Thus, the mixer is driven for a second time interval after the mixing cylinder is filled. In addition, relay R4, when energized, moves relay switch R4b out of engagement with its normally closed contact to prevent activation of serve light LG until the timer T2 times out and de-energizes relay R4. At that time, the serve light LG is activated to indicate to the operator that the mixing has been completed and that a dispensing cycle can be initiated.

A dispensing cycle is initiated by operating the dispensing valve actuator 96 to move the dispensing valve 44 from its closed position shown in solid lines to an open position shown in phantom lines in FIG. 4. When the dispensing valve is raised, it actuates the lever 107 and operates dispensing switches D1, D2, D3 and D4 from their normally closed contacts to their normally open contacts. The normally open contact of dispensing switch D3 is connected to conductor L1b so that relay R3 is energized when the dispensing switch D3 is moved into its normally open contact. Relay R3 operates relay switch R3a into engagement with its normally open contact to again energize the mixer drive motor 73 when the dispensing valve is in its fully open position. Dispensing switch D2 is connected in parallel with relay switches R4b and R3c and maintains the serve light actuated when relay switch R3c is opened. Draw switch D1 is connected to line L2 and to the initiate input terminal T3a of a time delay timer T3. The power input terminals T3b and T3d of Timer T3 are connected to lines L1 and L2 and a relay R9 is connected across the load terminals T3c and T3d. When draw switch D1 is actuated into engagement with its normally open contact, it establishes a circuit between initiate terminal T3a and load terminal T3d of timer T3. Timer T3 is a delay-on-break timer which is operative when a circuit is established between terminals T3a and T3d, to apply output voltage to the relay R9 connected across terminals T3c and T3d, and to maintain that voltage on the relay while the circuit is maintained between terminals T3a and T3d, and for a preselected time interval, for example one or two seconds after the circuit between T3a and T3d is interrupted. Relay R9 is operative, when energized, to move relay switch R9a from a position engaging its normally open contact as shown in FIG. 7 to a position engaging its normally closed contact. Relay switch R9a is connected in series with the solenoid S3 for operating the dispense valve V3 to an open position supplying pneumatic pressure to the actuator cylinder 101. Thus, the dispense solenoid S3 is energized while the draw valve is in its raised position and for a preselected time interval thereafter, to assure adequate time for dispensing the product from the mix cylinder, in the event the dispense valve is moved out of its fully open position before the dispense piston has reached its discharge or home position.

When the dispensing piston reaches its discharge or home position, the limit switch LS1 is actuated to its closed position and energizes relay R6 to move relay switch R6a to an open position. When relay switch R6a is opened, relay R3 is deenergized and relay switches R3a, R3b and R3c return to their normally closed positions. Switch R3b again establishes a circuit between terminals T2a and T2b which again energizes relay R4 and moves relay switch R4a into the normally open position to continue the blend motor run time for a time interval after the piston reaches the home position. This assures that the piston face 36a is rotated against the inner face of the discharge head 32a and thus wipe both surfaces and force the product into the discharge outlet. Draw switch D1 operates timer T3 to maintain the solenoid S3 energized while the draw valve was open and for a predetermined time interval thereafter to assure that the dispensing piston is moved to and maintained in its full discharge or home position during closing of the discharge valve.

From the foregoing it is thought that the construction and operation of the mixing and dispensing apparatus will be readily understood. A quantity of a selected flavoring material such as nuts, candies, fruits or syrups, is first introduced into the hopper 39b and the flavoring material feed piston is retracted either before or after introduction of the flavoring material into the hopper. The feed piston is adapted to be frictionally retained in an open position and can be manually moved toward a discharge position to confine the flavoring material in the feed cylinder 39. When either of the cycle initiation switches PL or PR is operated, fill solenoid S2 operates valve V2 to apply pressure to the inner side of the actuator head 37, to move the confection inlet valve 38 to its open position to allow frozen confection from the freezing cylinder to enter the mixing cylinder 31. The dispensing piston is initially in its home or discharge position and actuates limit switch LS1 to a closed position to energize relay R6 and open relay switch R6a. As the dispensing piston moves away from its home position adjacent the discharge head under the pressure of the incoming frozen confection from the frozen confection freezer F, limit switch LS1 opens and de-energizes relay R6 to allow relay switch R6a to close. When relay switch R6a is closed, solenoid S1 is energized to open valve V1 and supply fluid pressure to the flavoring material feed piston 41. The flavoring material is thus forced by the feed piston from the feed cylinder 39 into the mixing cylinder as the dispensing piston moves away from its home position under the pressure of the frozen confection entering through the confection inlet port. The dispensing piston operating on the actuator rod 85 moves the actuator piston 101a toward a retracted position and, when the actuator piston reaches a position to actuate either limit switch LS2 or LS3 depending on which push button switch PL or PR was actuated, fill solenoid S2 will be deenergized and allow valve V2 to return to the normal position applying pneumatic pressure to the outer side of the actuator head 37, to close the fill valve and stop filling of the mixing cylinder. At that time, timer T1 is actuated to energize relay R3 and operates the mixer drive motor 73 for a predetermined time interval determined by the setting of timer T1. When the timer T1 times out, after approximately three seconds, the timer T2 is activated and continues the blend cycle for about two additional seconds when timer T2 times out, the blend motor stops to prevent excessive mixing of the confection and flavoring material in the mixing cylinder.

The mixture can then be dispensed by manually operating the discharge valve 44 to its open position shown in phantom lines in FIG. 4. Opening of the discharge valve actuates draw switches D1–D4. Operation of draw switch D1 initiates a timing cycle in timer T3 and relay R9 actuates solenoid S3 to operate pneumatic valve V3 and apply fluid pressure to the pneumatic actuator 101 while the draw switch D1 is closed and for a predetermined time interval thereafter, to move the dispensing piston back to its first or home position and dispense the mixture from the mixing chamber. Opening of the dispensing valve 44 also operates draw switch D3 which is arranged to operate the mixer drive motor 73 while the draw valve is open and timer T2 continues operation of the mixer drive motor for a short time interval after the piston reaches home position to wipe the piston face and the inner face of the discharge head. The draw valve is held in its fully open position until the serve light Lg goes out.

The volume of material dispensed during each cycle is accurately controlled by the dispensing piston 36. The end of the flavoring material feed piston is shaped so that it conforms to the contour of the inner wall of the feed cylinder so that it is wiped by the dispensing piston as the dispensing piston moves in a discharge stroke. In addition, the inner end of the confection inlet valve 38 and the side face of the discharge valve 44 are disposed substantially flush with the inner face of the discharge head to minimize the volume of material remaining in the measuring cylinder when the piston is in its discharge or home position. The discharge valve is open during dispensing and the dispensing piston is rotated during dispensing so that the end face of the dispensing piston wipes across the edges of the discharge port to aid in removing material from the end of the dispensing piston. When the discharge valve is closed, the side face of the discharge valve wipes across the end face of the dispensing piston and discharges the remaining material through outlet 43a. The closed heat transfer pipe containing a vaporizable liquid is operative to cool the mixing cylinder and reduce melting of the frozen confection product during mixing and dispensing.

The embodiments of the invention in which an exclusive property or privilege is claimed are defined as follows:

1. Mixing and dispensing apparatus for a frozen confection machine having a refrigerated freeze chamber comprising, mixing and measuring chamber means including a mixing cylinder having an inner side wall; a head having an inner face extending across one end of the side wall; and piston means mounted in the cylinder for movement between a first position in which an end face of the piston means is contiguous to the inner face of the head and a second position in which the end face of the piston means is spaced a selected distance from the inner face of the head, the mixing and measuring chamber means having discharge passage means and a discharge valve movable from a closed position blocking flow through the discharge passage means and an open position, the mixing and measuring chamber means having a confection material inlet port adapted for connection to the freeze chamber of the frozen confection machine and confection inlet valve means movable between a closed position blocking flow to the confection material inlet port and an open position, the mixing and measuring chamber means having a flavoring material inlet port and a flavoring material feed chamber communicating with the flavoring material inlet port, flavoring material feed means for feeding flavoring material from the feed chamber to the mixing and measuring chamber means, rotary mixer means in the mixing and measuring chamber means, means for driving the rotary mixer means to mix materials in the mixing and measuring chamber means, and means for moving the piston means from said second position to said first position to discharge material from the mixing and measuring chamber means.

2. Mixing and dispensing apparatus according to claim 1 wherein mixer means is mounted for rotation coaxially of said cylinder, said piston means being mounted in the cylinder for rotation with the mixer means and for sliding movement relative thereto.

3. Mixing and dispensing apparatus according to claim 1 wherein said flavoring material inlet port opens at said inner side wall, said flavoring material feed means including a feed member movable in the feed chamber between a first position spaced from the flavoring material inlet port to allow introduction of a charge of flavoring material into the feed chamber and a second position contiguous to the flavoring material inlet port to force the charge of flavoring material out of the feed chamber and into the mixing and measuring chamber.

4. Mixing and dispensing apparatus according to claim 3 wherein said feed member, in said second position thereof, has a face disposed substantially flush with said inner side wall of the cylinder.

5. Mixing and dispensing apparatus according to claim 3 including means operative during movement of the piston means from said first to said second positions thereof for moving said feed member from said first position to said second position thereof.

6. Mixing and dispensing apparatus according to claim 1 wherein said discharge passage means comprises an elongated channel in said head opening at said inner face and defining a discharge outlet at one end of the channel, said discharge valve means comprising a discharge member slidable in said channel and having one side disposed substantially flush with said inner face of the head.

7. Mixing and dispensing apparatus according to claim 1 wherein said rotary mixer means includes a mixer head at the side of said piston means remote from the discharge head and a plurality of mixer elements on the head slidably extending through the piston means and terminating adjacent the discharge head, said piston means being mounted in the cylinder for rotation with the mixer means and for sliding movement relative thereto.

8. Mixing and dispensing apparatus according to claim 1 including selectively operable means for operating said confection inlet valve means to the open position to supply confection material to the mixing and measuring chamber, and means operative when the piston means is at said second position for operating said confection inlet valve means to the closed position thereof.

9. Mixing and dispensing apparatus according to claim 1 including selectively operable means for operating said confection inlet valve means to the open position thereof to supply confection material to the mixing and measuring chamber means, and means operative when the piston means is in said second position for operating said inlet valve means to the closed position, means for moving the discharge valve to the open position, and means operative when the discharge valve is open for moving said piston means from said second position to said first position.

10. Mixing and dispensing apparatus according to claim 9 including electric drive motor means for driving said rotary mixer means, and means responsive to movement of said piston means to said second position for actuating said drive motor means.

11. Mixing and dispensing apparatus according to claim 1 including, selectively operable means for operating said confection inlet valve means to the open position thereof to supply confection to the mixing and measuring chamber means, means for operating said flavoring material feed means to feed flavoring material from the feed chamber to the mixing and measuring chamber means, means operative when the piston means is at said second position for operating the confection inlet valve means to the closed position thereof, means for moving the discharge valve to the open position, and means operative when the discharge valve is open for moving the piston means from the second position to the first position.

12. Mixing and dispensing apparatus according to claim 1 wherein said discharge head has a generally flat inner face disposed perpendicular to the cylinder, said discharge passage means comprising an elongated channel opening at said inner face and defining a discharge outlet at one end of the channel, said discharge valve means comprising a discharge member slidable in said channel and having one side disposed substantially flush with said inner face of the head, said mixer means being mounted for rotation coaxially of said mixing cylinder, said piston means being mounted for rotation with the mixer means and for movement relative thereto in a direction axially of the cylinder means.

13. Mixing and dispensing apparatus according to claim 12 wherein said elongated channel extends generally vertically and said discharge outlet is at the lower end of the channel.

14. Mixing and dispensing apparatus according to claim 1 including heat transfer means for cooling said mixing cylinder, said heat transfer means comprising closed heat transfer passage means containing a vaporizable heat transfer fluid and having an evaporation zone in heat transfer relation with said mixing cylinder and a condensation zone adapted to extend into the refrigerated freeze chamber of the frozen confection machine.

15. Mixing and dispensing apparatus according to claim 1 including heat transfer means for cooling said mixing cylinder, said heat transfer means including a cooling jacket extending along at least a substantial portion of the mixing cylinder and a pipe communicating with the cooling jacket and extending into the freeze chamber of the frozen confection machine, said cooling jacket and pipe defining a closed heat transfer passage, and a vaporizable heat transfer fluid in the heat transfer passage.

16. Mixing and dispensing apparatus according to claim 15 wherein the cooling jacket has a portion disposed at a level below the pipe and providing a well for heat transfer fluid, and wick means in the cooling jacket extending from the well and upwardly around the mixing cylinder.

17. Mixing and dispensing apparatus for a frozen confection machine having a refrigerated freeze chamber comprising, mixing and measuring chamber means including a mixing cylinder having a cylindrical inner side wall, a discharge head having an inner face extending across one end of the mixing cylinder and piston means slidable in the mixing cylinder, a discharge passage in the discharge head opening at said inner face, discharge valve means mounted on the discharge head for movement between a closed position blocking flow through said discharge passage and an open position, the mixing and measuring chamber means having a confection inlet port and confection inlet valve means movable between a closed position blocking flow through the inlet port and an open position, the mixing and measuring chamber means having a flavoring material inlet port and a flavoring material feed cylinder communicating with said flavoring material inlet port, a feed piston slidable in the feed cylinder between an extended position in which one end of the feed piston is adjacent said mixing and measuring chamber and a retracted position in which said one end of the feed piston is spaced from the flavoring material inlet port to receive a charge of flavoring material, mixer means mounted for rotation coaxially of the mixing cylinder, piston means mounted in the mixing cylinder for rotation with the mixer means and for sliding movement relative to the mixing cylinder and relative to the mixer means between a first position in which an end face of the piston means is contiguous to the inner face of the discharge head and a second position in which the piston end face is spaced from the discharge head, motor means operable to drive said rotary mixer means, and means for moving said piton means from said second position to said first position to discharge material from the mixing and measuring chamber.

18. Mixing and dispensing apparatus according to claim 17 wherein confection inlet port is in the inner face of the discharge head, and the inlet valve means, when in the closed position thereof, has a portion that extends across said confection inlet port closely adjacent the inner face of the discharge head.

19. Mixing and dispensing apparatus according to claim 17 wherein the flavoring material inlet port is in the inner side wall of the mixing cylinder and one end of the feed piston has a concave configuration to extend substantially flush with the inner side wall of the mixing cylinder when the feed piston is in its extended position.

20. Mixing and dispensing apparatus according to claim 17 wherein the flavoring material inlet port is in the inner side wall of the mixing cylinder and one end of the feed piston has a concave configuration to extend substantially flush with the inner side wall of the mixing cylinder when the feed piston is in its extended position, the confection inlet port is in the inner face of the discharge head and the inlet valve means, when in said closed position thereof, has a portion that extends across said confection inlet port closely adjacent the inner face of the discharge head.

21. Mixing and dispensing apparatus according to claim 20 wherein said discharge passage comprises an elongated slot having one side opening at said inner face of the discharge head and a discharge opening at an end of the slot, said discharge valve means comprising a discharge valve member slidable in said slot and having one side disposed substantially flush with said inner face of the discharge head.

22. Mixing and dispensing apparatus according to claim 17 wherein said discharge passage comprises an elongated slot having one side opening at said inner face of the discharge head and a discharge opening at an end of the slot, said discharge valve means comprising a discharge valve member slidable in said slot and having one side disposed substantially flush with said inner face of the discharge head.

23. Mixing and dispensing apparatus according to claim 17 including selectively operable means for operating said confection inlet valve means to said open position, means operative after the piston means is moved to said second position for operating said inlet valve means to said closed position, selectively operable means for moving said discharge valve means to the open position thereof, and means operative when the discharge valve means is moved to the open position thereof for moving said piston means from the second position to said first position thereof.

24. Mixing and dispensing apparatus according to claim 17 including, selectively operable means for operating said confection inlet valve means to the open position thereof to supply confection to the mixing and measuring chamber means, means for operating said flavoring material feed means to feed flavoring material from the feed chamber to the mixing and measuring chamber means, means operative when the piston means is at said second position for operating the confection inlet valve means to the closed position thereof, means for moving the discharge valve to the open position, and means operative when the discharge valve is in the open position thereof for moving the piston means from the second position to the first position thereof.

25. Mixing and dispensing apparatus according to claim 24 including electric drive motor means for driving said rotary mixer means, timer means responsive to movement of said piston means to said second position for a energization of said motor means for a preselected time.

26. An apparatus for mixing and dispensing according to claim 25 including means for energizing said motor means during movement of said piston means from said second position to said first position.

27. Mixing and dispensing apparatus according to claim 17 including heat transfer mans for cooling said mixing cylinder, said heat transfer means comprising closed heat transfer passage means containing a vaporizable heat transfer fluid and having an evaporation zone in heat transfer relation with said mixing cylinder and a condensation zone adapted to extend into the refrigerated freeze chamber of a frozen confection machine.

28. Mixing and dispensing apparatus according to claim 17 including heat transfer means for cooling said mixing cylinder, said heat transfer means including a cooling jacket extending along at least a substantial portion of the mixing cylinder and a pipe communicating with the cooling jacket and adapted to extend into the freeze chamber of a frozen confection machine, said cooling jacket and pipe defining a closed heat transfer passage, and a vaporizable heat transfer fluid in the heat transfer passage.

29. Mixing and dispensing apparatus according to claim 28 wherein the cooling jacket has a portion disposed at a level below the pipe and providing a well for heat transfer fluid, and wick means in the cooling jacket extending from the well and upwardly around the mixing cylinder.

30. Mixing and dispensing apparatus for a frozen confection machine comprising, mixing and measuring chamber means including a mixing cylinder having an inner cylindrical side wall; a discharge head having a flat inner face extending across one end of the mixing cylinder; and piston means slidable in the mixing cylinder, the mixing and measuring chamber means having a confection inlet port and a flavoring material inlet port, a discharge channel in the discharge head having a lengthwise extending side opening intersecting said inner face and a discharge outlet at one end of the channel, a discharge valve member slidably mounted in the discharge channel and operable between a retracted position spaced from the discharge outlet and an extended position adjacent the discharge outlet, the discharge valve member having a cross section complementary to the channel to substantially fill the same in said extended position and a flat side substantially flush with the inner face of the discharge head, rotary mixer means mounted in the mixing cylinder coaxially thereof and extending closely adjacent said inner face of the discharge head, means operable to rotate the mixer means, the piston means being mounted in the mixing cylinder for rotation with the mixer means and for sliding movement relative the mixing cylinder and to the mixing means and movable between a first position in which an end face of the piston means is contiguous to the inner face of the discharge head and a second position in which the piston means end face is spaced from the discharge head.

* * * * *